United States Patent
Hayashikawa et al.

(10) Patent No.: US 7,668,636 B2
(45) Date of Patent: Feb. 23, 2010

(54) CONTROL SYSTEM OF VEHICLE

(75) Inventors: Kazufumi Hayashikawa, Nagoya (JP); Misato Takei, Okazaki (JP)

(73) Assignee: Mitsubishi Jidosha Kogyo Kabushiki Kaisha., Tokyo (JP)

( * ) Notice: Subject to any disclaimer, the term of this patent is extended or adjusted under 35 U.S.C. 154(b) by 0 days.

(21) Appl. No.: 12/200,664

(22) Filed: Aug. 28, 2008

(65) Prior Publication Data

US 2009/0062991 A1    Mar. 5, 2009

(30) Foreign Application Priority Data

Aug. 31, 2007    (JP)    ............. 2007-225441

(51) Int. Cl.
*B60T 8/00*    (2006.01)
(52) U.S. Cl. .............. 701/48; 701/70; 701/76
(58) Field of Classification Search .......... 701/48, 701/70, 71, 76, 78
See application file for complete search history.

(56) References Cited

U.S. PATENT DOCUMENTS

| | | | |
|---|---|---|---|
| 4,504,911 A * | 3/1985 | Braschel et al. | ............... 701/76 |
| 5,580,136 A * | 12/1996 | Hanschek | .............. 303/155 |
| 6,442,502 B1 | 8/2002 | Lohberg et al. | |
| 2002/0003417 A1 * | 1/2002 | Bito et al. | ............... 320/152 |
| 2007/0087897 A1 * | 4/2007 | Kitamura | ............... 477/115 |

FOREIGN PATENT DOCUMENTS

| | | | |
|---|---|---|---|
| JP | 6-129948 A | 5/1994 |
| JP | 8-20326 A | 1/1996 |
| JP | 10-197546 A | 7/1998 |
| JP | 2002-513473 A | 5/2002 |
| JP | 2003-291693 A | 10/2003 |
| JP | 2005-238950 A | 9/2005 |
| JP | 2005-297777 A | 10/2005 |
| JP | 2006-199146 A | 8/2006 |
| JP | 2006-199270 A | 8/2006 |

OTHER PUBLICATIONS

JP 2005-238950 Translation.*

* cited by examiner

*Primary Examiner*—Thomas G Black
*Assistant Examiner*—Ce Li
(74) *Attorney, Agent, or Firm*—Birch, Stewart, Kolasch & Birch, LLP

(57) ABSTRACT

A brake-related ECU (46) terminates control on the basis of a control stop signal sent from a body-related ECU (40) connected with the brake-related ECU by a CAN 1, an engine revolving speed supplied from an engine ECU (42) connected with the brake-related ECU by the CAN 1, and wheel speeds detected by wheel speed sensors (20L, 20R, 22L, 22R) connected with the brake-related ECU by electric wiring (60).

8 Claims, 3 Drawing Sheets

CONTROL SYSTEM OF VEHICLE

BACKGROUND OF THE INVENTION

1. Field of the Invention

This invention relates to a control system of a vehicle.

2. Description of the Related Art

In vehicles, a variety of electronic control units (ECUs) are installed to electronically control vehicle-mounted devices.

For example, there are installed an engine ECU for controlling an engine, a transmission ECU for controlling a transmission, a brake-related ECU for performing control according to brake operation, and braking-force control in anti-lock braking system, traction control, etc., a drive-related ECU for controlling distribution of drive force among wheels, a body-related ECU for controlling body-related devices such as doors, windows, windshield wipers, lights and like, etc.

Such ECUs, etc. are connected by a communication path allowing them to communicate with each other, such as an in-vehicle LAN according to the CAN (controller area network) standard (see Japanese Patent Publication 2005-238950, for example).

In such configuration, when a specified ECU, for example, the transmission ECU receives a signal indicating that the ignition switch is in "on" position, the transmission ECU sends a control start signal to pertinent ECUs.

Generally, when the ignition switch is shifted to "off" position, the transmission ECU sends a control stop signal to the pertinent ECUs so that they terminate control.

In such configuration, however, if, while the vehicle is moving, the ignition switch is shifted to the "off" position by erroneous operation, or a control stop signal is erroneously sent to the pertinent ECUs due to failure of the transmission ECU that receives a signal indicating whether the ignition switch is on or off, or a defect or the like of the communication path connecting the ECUs does not allow normal communications among the ECUs, there is caused a problem that the ECUs terminate control while the vehicle is moving.

This is undesirable, particularly because stop of control over braking systems such as an ABS may impair running safety.

SUMMARY OF THE INVENTION

The present invention has been made to solve the problems as mentioned above. The primary object thereof is to provide a control system of a vehicle which can maintain the vehicle's running safety even if the ignition switch is erroneously operated or a control stop signal is erroneously sent or the communication line has a defect or the like.

In order to achieve the above object, the present invention provides a control system of a vehicle, comprising: a startstop signal control section configured to transmit a control start signal when an ignition switch is put in "on" position and a control stop signal when the ignition switch is put in "off" position, a moving-state detection section configured to detect a moving-state correlated value from which whether the vehicle is moving or at rest can be determined, and a braking-force control section configured to control braking force exerted on the vehicle, connected with the start-stop signal control section by a first path and connected with the moving-state detection section by a second path, wherein the braking-force control section starts control on the condition that the braking-force control section receives a control start signal from the start-stop signal control section, and terminates control on the conditions that the braking-force control section receives a control stop signal from the start-stop signal control section and that the moving-state correlated value detected by the moving-state detection section indicates that the vehicle is at rest.

A further scope of applicability of the present invention will become apparent from the detailed description given hereinafter. However, it should be understood that the detailed description and specific example, while indicating embodiments of the invention, are given by way of illustration only, since various changes and modifications within the sprit and scope of the invention will become apparent to those skilled in the art from this detailed description.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

Figure 1:
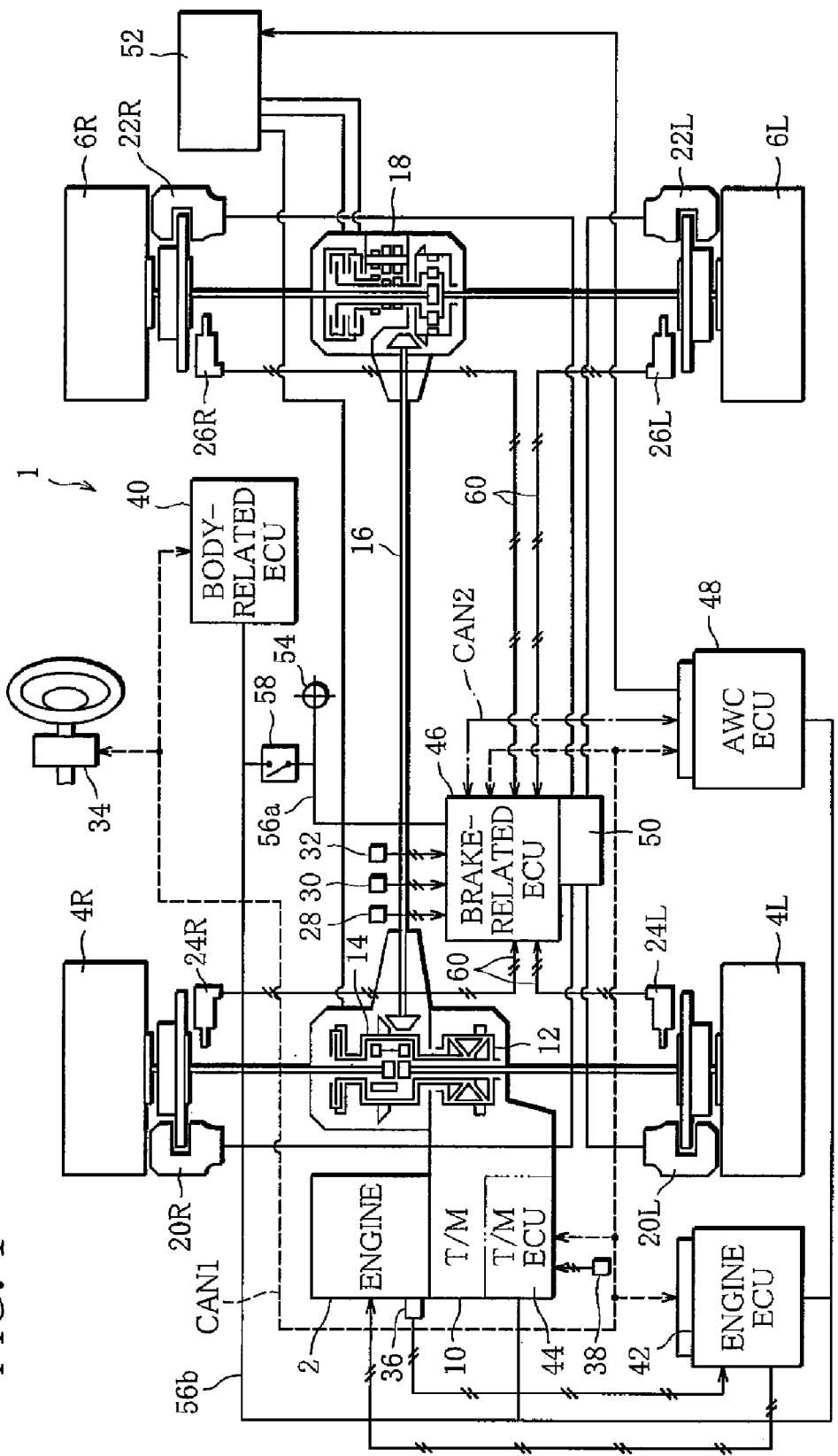
FIG. 1 is diagram schematically showing the structure of a drive-force control system of a vehicle, which is an embodiment of the present invention.

Referring to the drawings attached, an embodiment of the present invention will be described.

Figure 2:
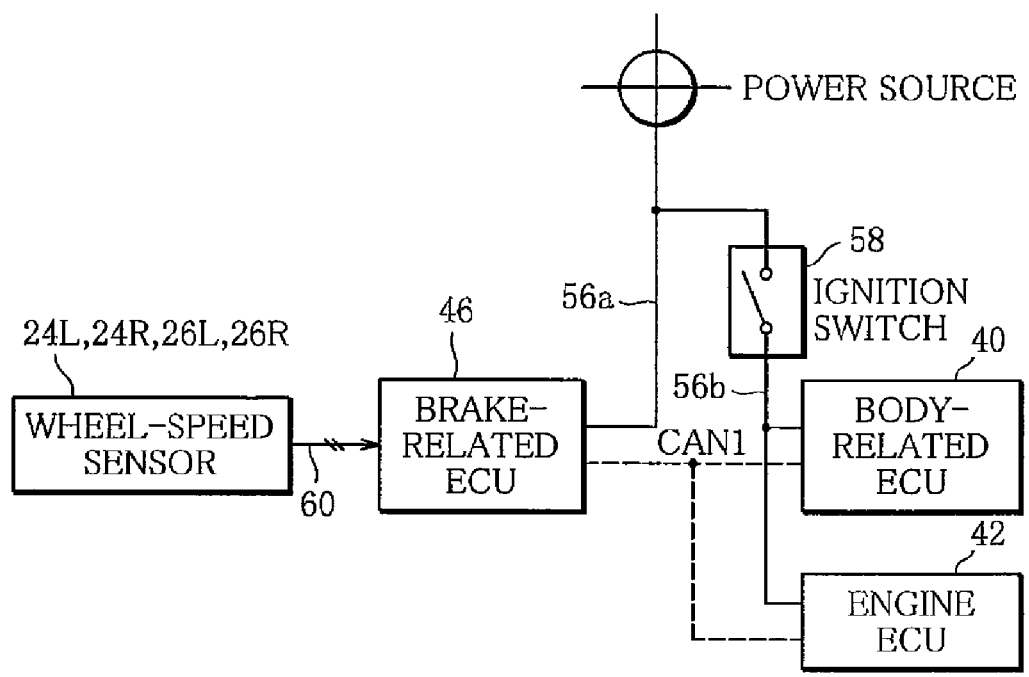
FIG. 2 is a block diagram concerning the control termination conditions on which a brake-related ECU terminates control in the embodiment shown in FIG. 1.

FIG. 1 schematically shows the structure of a control system of a vehicle according to the present invention, and FIG. 2 is a block diagram concerning the control termination conditions on which a brake-related ECU terminates control in the present invention.

The vehicle 1 shown in FIG. 1 is a four-wheel drive vehicle in which an engine 2 (drive source) is installed in a front part of a vehicle body, and which has four drive wheels, i.e., a front left wheel 4L and a front right wheel 4R (collectively referred to as "front wheels 4") and a rear left wheel 6L and a rear right wheel 6R (collectively referred to as "rear wheels 6").

A transmission (T/M) 10 is connected with the engine 2, and a center differential 12 is connected with the transmission 10.

The center differential 12 is mounted on an axle of the front wheels 4 to distribute drive force between the front wheels 4 and the rear wheels 6.

The center differential 12 is connected with a front differential 14 which is also mounted on the axle of the front wheels 4.

The front differential 14 distributes the drive force distributed to the front wheels 4 by the center differential 12, between the front left wheel 4L and the front right wheel 4R.

The center differential 12 is also connected with an end of a propeller shaft 16. The propeller shaft 16 is connected with a rear differential 18 at the other end to transmit the drive force distributed to the rear wheels 6 by the center differential 12, to the rear differential 18.

The rear differential 18 is mounted on an axle of the rear wheels 6 to distribute the drive force transmitted by the propeller shaft 16, between the rear left wheel 6L and the rear right wheel 6R, depending on how the vehicle 1 is being driven.

Brakes 20L, 20R, 22L, 22R are provided to the wheels 4L, 4R, 6L, 6R of the vehicle 1 to apply braking force to the wheels 4L, 4R, 6L, 6R, respectively.

Further, wheel-speed sensors 24L, 24R, 26L, 26R (moving-state detection section; wheel-speed detection section) are provided to the wheels 4L, 4R, 6L, 6R to detect wheel-speed, respectively.

In the vehicle 1, a variety of sensors, such as a longitudinal g-force sensor 28 for detecting longitudinal g-force exerted on the vehicle 1, a lateral g-force sensor 30 for detecting lateral g-force, a yaw rate sensor 32 for detecting yaw rate, a steering wheel angle sensor 34 for detecting steering wheel angle, an engine revolving speed sensor 36 for detecting engine revolving speed, and a shift position sensor 38 for detecting the position to which the driver has shifted a shift lever, are also installed.

Further, a body-related ECU 40 (start-stop signal control section) for controlling body-related devices, such as doors, windows, windshield wipers and lights (not shown), an engine ECU 42 (second moving-state detection section) for controlling the engine 2, a transmission ECU (hereinafter referred to as "T/M ECU") for controlling the transmission 10, a brake-related ECU 46 (braking-force control section) for controlling braking force applied by the respective brakes 20L, 20R, 22L, 22R, and an all-wheel-control ECU (hereinafter referred to as "AWC ECU") 48 for controlling drive-force distribution by the center differential 12 and the rear differential 18 are installed in the vehicle 1.

Specifically, the engine ECU 42 performs fuel injection control, ignition timing control, etc. on the basis of information from the engine revolving speed sensor 38 and other sensors not shown, thereby regulating engine torque, etc.

The T/M ECU 44 controls gear ratio according to the position detected by the shift position sensor 38.

The brake-related ECU 46 is connected with a brake hydraulic unit 50 capable of regulating hydraulic pressure supplied to the respective brakes 20L, 20R, 22L, 22R, to control the braking force applied by the respective brakes 20L, 20R, 22L, 22R, by means of the brake hydraulic unit 50.

In addition to controlling the braking force according to the driver's brake operation, the brake-related ECU 46 performs, for example, so-called electronic braking-force distribution (hereinafter referred to as "EBD") control for controlling driving-force distribution between the front wheels 4 and the rear wheels 6 depending on how the vehicle is being driven, so-called anti-lock braking system (hereinafter referred to as "ABS") control based on the wheel-speeds, for preventing the wheels from locking under harsh braking, braking on a road surface with a low coefficient of friction, etc., while maintaining appropriate braking force, good handling and vehicle stability, so-called active stability control (hereinafter referred to as "ASC") for stabilizing the vehicle attitude while maintaining appropriate drive force by regulating the braking force applied by the respective brakes 20L, 20R, 22L, 22R, etc.

The AWC ECU 48 is connected with a differential hydraulic unit 52 capable of regulating hydraulic pressure supplied to the center differential 12 and the rear differential 18, to control the center differential 12's drive-force distribution between the front wheels 4 and the rear wheels 6, the rear differential 18's drive-force distribution between the rear left wheel 6L and the rear right wheel 6R, etc., by means of the differential hydraulic unit 52.

The respective ECUs 40, 42, 44, 46 and 48 are connected to a power source 54, which is a battery mounted on the vehicle 1, by power wire 56.

Specifically, power wire 56a running directly from the power source 54 is connected with the brake-related ECU 46, and power wire 56b with an ignition switch 58 interposed is connected with the other ECUs 40, 42, 44, 48.

By the driver's putting the ignition switch 58 in "on" position or "off" position, the power wire 56b is connected to or disconnected from the power source 54, respectively.

The ECUs 40, 42, 44, 46, 48 are connected by a CAN 1 (first path), which is a communication path according to the CAN (controller area network) standard and allows the ECUs to communicate with each other.

The brake-related ECU 46 and the AWC ECU 48 are also connected by a CAN 2 (third path), in addition to the CAN 1.

Next, how the control system of the vehicle according to the present invention, configured as described above, operates will be described.

In the above-described vehicle 1, when the ignition switch 56 is put in the "on" position, the body-related ECU 40 recognizes that the ignition switch is on, and sends a control start signal to the ECUs 42, 44, 46, 48 through the CAN 1. When receiving the control start signal, the ECUs 42, 44, 46, 48 start control, respectively.

When the ignition switch 56 is shifted to the "off" position, the body-related ECU 40 recognizes that the ignition switch is off, and sends a control stop signal to the ECUs 42, 44, 46, 48.

When receiving the control stop signal, the engine ECU 42, the T/M ECU 44 and the AWC ECU 48 except for the brake-related ECU 46 terminate control, respectively.

The brake-related ECU 46 terminates braking-force control when predetermined control termination conditions are satisfied.

Next, the control termination conditions on which the brake-related ECU 46 terminates control will be explained in detail.

As shown in FIG. 2, the ignition switch 58, the body-related ECU 40 and the wheel-speed sensors 42 are related to the control termination conditions on which the brake-related ECU 46 terminates control.

First, one of the control termination conditions is that the brake-related ECU 46 receives a control stop signal sent from the body-related ECU 40 through the CAN 1.

The brake-related ECU 46 is connected with the engine ECU 42 by the CAN 1, and receives engine revolving speed information which the engine ECU 42 has.

Thus, another of the control termination conditions on which the brake-related ECU 46 terminates control is that the engine revolving speed received is below a predetermined engine revolving speed (below 300 rpm, for example), thus indicating that the vehicle is at rest.

The brake-related ECU 46 is supplied with the wheel-speeds of the wheels 4L, 4R, 6L, 6R, from the wheel-speed sensors 24L, 24R, 26L, 26R connected with it by electric wiring 60 (second path).

Thus, another of the control termination conditions on which the brake-related ECU 46 terminates control is that the wheel-speeds detected by the wheel-speed sensors 24L, 24R, 26L, 26R are below a predetermined wheel-speed, thus indicating that the vehicle is at rest. Wheel speed is a measurement of vehicle speed, and the predetermined wheel-speed is a wheel-speed corresponding to a vehicle speed 1 km/h, for example.

Thus, when the brake-related ECU 46 receives a control stop signal from the body-related ECU 40 and the engine revolving speed is below the predetermined engine revolving speed and the wheel-speeds are below the predetermined wheel-speed, the control termination conditions are satisfied, so that the brake-related ECU 46 terminates the braking-force control.

This means that even when receiving the control stop signal, the brake-related ECU 46 maintains the braking-force control if it is determined that the vehicle is moving.

Thus, for example, when the ignition switch is shifted to the "off" position due to the driver's erroneous operation, failure or the like, or the control stop signal is transmitted due to failure of the body-related ECU 40 or the like while the vehicle is moving, the brake-related ECU 46 maintains the braking-force control unless the wheel-speeds are below the predetermined wheel-speed and the engine revolving speed is below the predetermined engine revolving speed.

Further, for example, when the CAN 1 fails so that communications among the ECUs 40, 42, 44, 46, 48 are interrupted while the vehicle is moving, the brake-related ECU 46 likewise maintains the braking-force control unless the wheel-speeds detected by the wheel-speed sensors 24L, 24R, 26L, 26R connected directly with the brake-related ECU 46 are below the predetermined wheel-speed. It is to be noted that when the CAN 1 fails, steering wheel angle information ceases to be supplied from the steering wheel angle sensor 34 connected by the CAN 1, so that the brake-related ECU 46 cannot perform ASC control. The brake-related ECU 46, however, maintains ABS control and EBD control which can be performed when wheel-speed information is supplied.

Thus, in the control system of the vehicle according to the present invention, the brake-related ECU 46 terminates control on the basis of the wheel-speeds and engine revolving speed from which whether the vehicle is moving or at rest can be determined, in addition to the control stop signal related to the ignition switch 58. This results in the vehicle's running safety being maintained, since the braking force control, particularly the ABS control, the EBD control and the like for enhancing safety are maintained, even if the ignition switch 48 is erroneously operated or a control stop signal is erroneously transmitted or the CAN 1 fails while the vehicle is moving.

Figure 3:
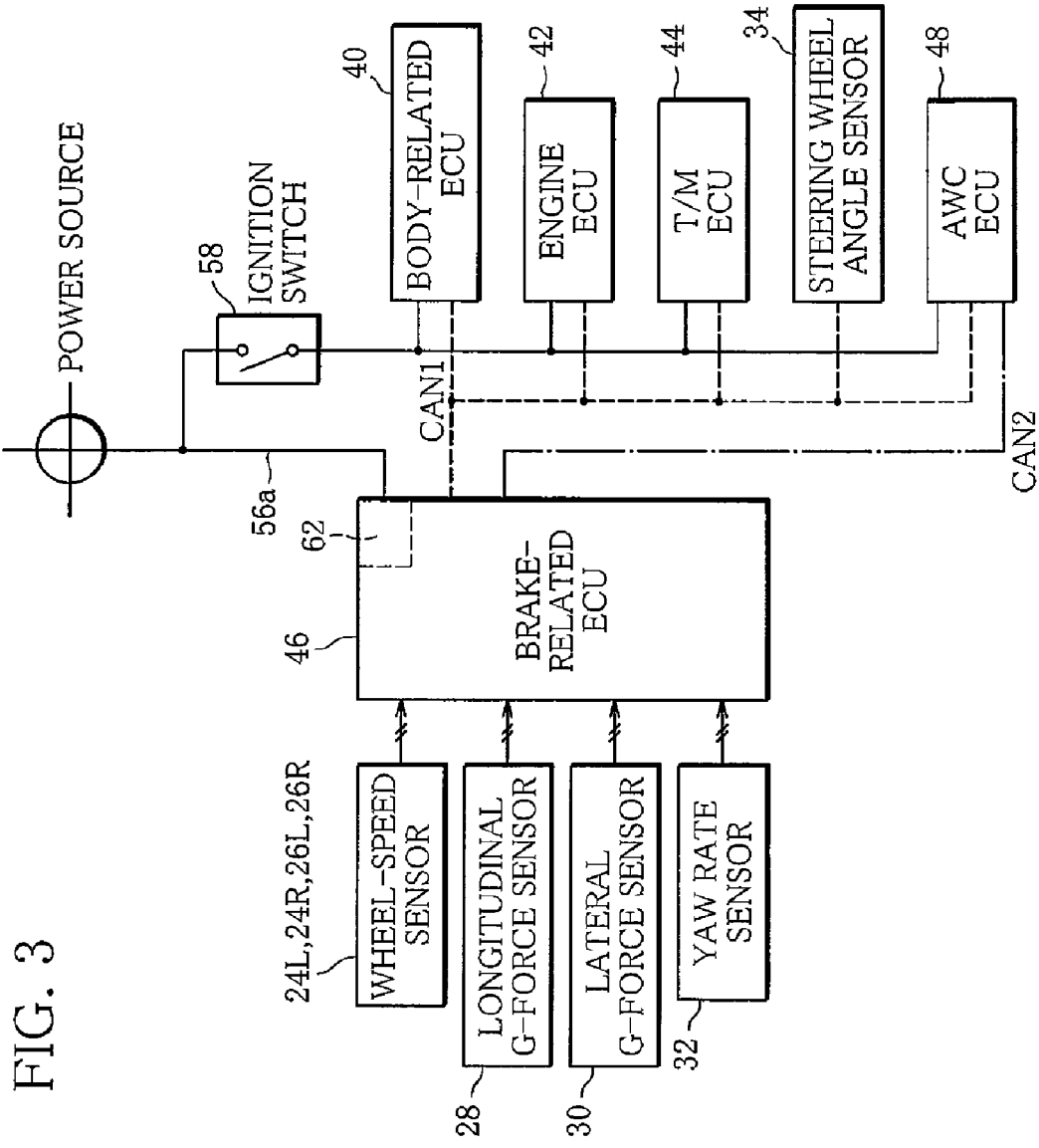
FIG. 3 is a block diagram concerning the control termination conditions on which a brake-related ECU terminates control in a variant of the embodiment.

The control system of the vehicle according to the present invention is not limited to the above-described embodiment. FIG. 3 is a block diagram concerning the control termination conditions on which the brake-related ECU terminates control in a variant of the above-described embodiment. Referring to this figure, the variant will be described below.

As seen in FIG. 3, in the variant, in addition to the devices mentioned in the above-described embodiment, the longitudinal g-force sensor 28, the lateral g-force sensor 30 and the yaw rate sensor 32, which are each connected with the brake-related ECU 46 by the electric wiring 60, the T/M ECU 44 and the steering wheel angle sensor 34 (second moving-state detection section), which are connected with the brake-related ECU 46 by the CAN 1, the AWC ECU 48 (third moving-state detection section), which is connected with the brake-related ECU 46 by the CAN 1 and the CAN 2, and a power-source voltage detection section 62 (voltage detection section) provided within the brake-related ECU 46 are related to the control termination conditions on which the brake-related ECU 46 terminates control.

Specifically, one of the control termination conditions is that values relating to vehicle behavior detected by the longitudinal g-force sensor 28, the lateral g-force sensor 30 and the yaw rate sensor 32 are each below a predetermined value (0, for example), thus indicating that the vehicle is at rest.

Another of the control-termination conditions is that the brake-related ECU 46 receives shift position information which the T/M ECU 44 has, where the shift position information indicates that the shift lever is in a position for stopping the vehicle ("park" position, for example).

Another of the control termination conditions is that the steering wheel angle detected by the steering wheel angle sensor 34 indicates that the steering wheel is not being operated.

Another of the control termination conditions is that the AWC ECU 48 has stopped signal transmission through the CAN 2. It is to be noted that the AWC ECU 48 stops signal transmission, for example when terminating drive-force distribution control.

The AWC ECU 48 terminates control also when the ignition switch is shifted to the "off" position. Thus, even if the CAN 1 fails, the brake-related ECU 46 determines whether the ignition switch is on or off from signal transmission from the AWC ECU 48.

The power source voltage detection section 62 of the brake-related ECU 46 detects power source voltage, which generally decreases when the engine 2 stops. Thus, another of the control termination conditions is that the power source voltage is below a predetermined voltage, thus indicating that the engine is stopped.

Increasing the types of information used in determining the vehicle's moving state and/or increasing the number of communication paths or the like used therein leads to an increased accuracy of determination as to whether the vehicle is moving or at rest, and therefore, more reliable maintaining of the vehicle's running safety.

In the above, embodiments of control system of a vehicle according to the present invention have been described. The present invention is, however, not limited to the described embodiments.

For example, in the described embodiments, the body-related ECU 40 sends a control start signal when the ignition switch is put in the "on" position and a control stop signal when the ignition switch is put in the "off" position. The device which is to perform such signal transmission is not limited to the body-related EUC 40. Another ECU may perform it.

Further, although in the described embodiments, the vehicle 1 is a four-wheel drive vehicle, the vehicle 1 may be a vehicle with front-wheel drive or rear-wheel drive.

Further, in the described embodiments, the wheel-speed sensors 24L, 24R, 26L, 26R, the engine ECU 42, the longitudinal g-force sensor 28, the lateral g-force sensor 30, the yaw rate sensor 32, the T/M ECU 44, the steering wheel angle sensor 34, the AWC ECU 48, and the power source voltage detection section 62 are provided as moving-state detection means. The moving-state detection means is not limited to these. Any device that can detect a moving-state correlated value from which whether the vehicle is moving or at rest can be determined may be used.

Further, although in the described embodiments, the paths connected to the brake-related ECU 46 are the CAN 1, the CAN 2 and the electric wiring 60, the types of paths connected to the brake-related ECU 46 are not limited to these and the number of paths connected thereto is not limited to three.

FIG. 1
2: ENGINE
40: BODY-RELATED ECU
42: ENGINE ECU
46: BRAKE-RELATED ECU

FIG. 2
Power Source
24L, 24R, 26L, 26R: WHEEL-SPEED SENSOR

40: BODY-RELATED ECU
42: ENGINE ECU
46: BRAKE-RELATED ECU
58: IGNITION SWITCH

FIG. 3
Power Source
24L. 24R, 26L, 26R: WHEEL-SPEED SENSOR
28: LONGITUDIANL g-FORCE SENSOR
30: LATERL g-FORCE SENSOR
32: YAW RATE SENSOR
34: STEERING WHEEL ANGLE SENSOR
40: BODY-RELATED ECU
42: ENGINE ECU
46: BRAKE-RELATED ECU
48: AWC ECU
58: IGNITION SWITCH

What is claimed is:

1. A control system of a vehicle, comprising:
a start-stop signal control section configured to transmit a control start signal when an ignition switch is put in "on" position and a control stop signal when the ignition switch is put in "off" position,
a moving-state detection section configured to detect a moving-state correlated value from which whether the vehicle is moving or at rest can be determined, and
a braking-force control section configured to control braking force exerted on the vehicle, connected with the start-stop signal control section by a first path and connected with the moving-state detection section by a second path provided separately from the first path, wherein
the braking-force control section starts said braking-force control on the control start condition that the braking-force control section receives a control start signal from the start-stop signal control section, and terminates said braking-force control on the control termination conditions that the braking-force control section receives a control stop signal from the start-stop signal control section and that the moving-state correlated value detected by the moving-state detection section indicates that the vehicle is at rest.

2. The control system of the vehicle according to claim 1, wherein
the moving-state detection section is a wheel-speed detection section configured to detect wheel-speeds of wheels of the vehicle as the moving-state correlated value, and
the braking-force control section terminates control on the condition that the wheel-speeds detected are below a predetermined value, thus indicating that the vehicle is at rest.

3. The control system of the vehicle according to claim 2, wherein
the braking-force control section performs at least one of anti-lock braking control for preventing the wheels of the vehicle from locking, while applying braking force, and longitudinal braking-force distribution control for distributing braking force between front wheels and rear wheels of the vehicle, on the basis of the wheel-speeds detected by the wheel-speed detection section.

4. The control system of the vehicle according to claim 1, further comprising:
a second moving-state detection section configured to detect second moving-state correlated value from which whether the vehicle is moving or at rest can be determined, wherein
the braking-force control section is connected with the second moving-state detection section by the first path, and terminates control further on the condition that the second moving-state correlated value detected by the second moving-state detection section indicates that the vehicle is at rest, in addition to said termination conditions.

5. The control system of the vehicle according to claim 4, wherein
the second moving-state detection section detects revolving speed of a drive source of the vehicle as the second moving-state correlated value, and whether the vehicle is moving or at rest is determined, depending on whether the revolving speed detected indicates that the drive source is operating or that the drive source is stopped.

6. The control system of the vehicle according to claim 1, further comprising:
a third moving-state detection section configured to detect a third moving-state correlated value from which whether the vehicle is moving or at rest can be determined, wherein
the braking-force control section is connected with the third moving-state detection section by a third path, and terminates control further on the condition that the third moving-state correlated value detected by the third moving-state detection section indicates that the vehicle is at rest, in addition to said termination conditions.

7. The control system of the vehicle according to claim 1, wherein
the braking-force control section includes a voltage detection section configured to detect voltage supplied by a power source of the vehicle, and terminates control further on the condition that the voltage detected is below a predetermined voltage, thus indicating that the vehicle is at rest, in addition to said termination conditions.

8. The control system for the vehicle according to claim 7, wherein
voltage below the predetermined voltage is voltage when the drive source of the vehicle is stopped.

* * * * *